United States Patent [19]
Lin

[11] Patent Number: 5,832,870
[45] Date of Patent: Nov. 10, 1998

[54] MANIFOLD FOR AERATING AND CIRCULATING AQUARIUM WATER

[76] Inventor: Yu-An Lin, No. 13, Wen Ming Lane, Erh Lin Chen, Chang Hua Hsien, Taiwan

[21] Appl. No.: 841,699

[22] Filed: Apr. 30, 1997

[51] Int. Cl.⁶ .................................................. A01K 63/04
[52] U.S. Cl. .......................................... 119/261; 119/263
[58] Field of Search ..................... 119/259, 261, 119/262, 263, 226, 227, 228, 229

[56] References Cited

U.S. PATENT DOCUMENTS

| | | | |
|---|---|---|---|
| 3,146,195 | 8/1964 | Bernardi | 210/169 |
| 3,640,516 | 2/1972 | Willinger | 261/121 M |
| 3,815,547 | 6/1974 | Willinger et al. | 119/5 |
| 3,994,807 | 11/1976 | Macklem | 210/63 R |
| 4,151,810 | 5/1979 | Wiggins | 119/5 |
| 4,304,740 | 12/1981 | Cernoch | 261/121 R |
| 5,127,366 | 7/1992 | Kim | 119/5 |
| 5,160,431 | 11/1992 | Marioni | 210/169 |
| 5,171,438 | 12/1992 | Korcz | 210/169 |
| 5,246,571 | 9/1993 | Woltmann | 210/86 |
| 5,460,722 | 10/1995 | Chen | 210/615 |

Primary Examiner—Robert P. Swiatek
Assistant Examiner—James S. Bergin
Attorney, Agent, or Firm—Browdy and Neimark

[57] ABSTRACT

A manifold for use in aerating and circulating the aquarium water is composed of a main tube, at least one bypass tube extending from the main tube, and at least one aerating tube extending from the bypass tube such that the aerating tube is parallel to the main tube and that the top end of the aerating tube is in contact with atmospheric air and further that the bottom end of the aerating tube is submerged in the aquarium water. The main tube has a top end in communication with a filtration device of the aquarium, and a bottom end which is engaged with a water pump located at the bottom of the aquarium. The bypass tube forms an angle with the main tube such that the bypass tube is provided with an uphill segment contiguous to the main tube, and a downhill segment contiguous to the aerating tube.

4 Claims, 3 Drawing Sheets

MANIFOLD FOR AERATING AND CIRCULATING AQUARIUM WATER

FIELD OF THE INVENTION

The present invention relates generally to an aquarium and more particularly to a manifold for aerating and circulating water of the aquarium.

BACKGROUND OF THE INVENTION

As shown in FIG. 1, the conventional aquarium is generally composed of a water tank 10, a water circulating and filtering device 11, and an aeration device 13. Such a prior art aquarium as described above is not cost-effective in view of the fact that the water circulating and filtering device 11 and the aeration device 13 are independent of each other. In addition, the devices 11 and 13 are relatively noisy and take up too much of the space of the water tank 10.

SUMMARY OF THE INVENTION

It is therefore the primary objective of the present invention to provide an aquarium manifold capable of circulating and aerating water simultaneously.

It is another objective of the present invention to provide an aquarium manifold which is simple in construction and is cost-effective.

In keeping with the principle of the present invention, the foregoing objectives of the present invention are attained by the manifold, which consists of a water tube, a by-pass tube, and an aerating tube. The manifold is submerged such that the top end of the aerating tube is below the water surface. As the water flows through the water tube, the water is guided into the aerating tube via the by-pass tube so as to bring about the aeration of the aquarium water.

The foregoing objectives, features and functions of the present invention will be more readily understood upon a thoughtful deliberation of the following detailed description of the embodiments of the present invention with reference to the accompanying drawings.

DETAILED DESCRIPTION OF THE INVENTION

Figure 1:
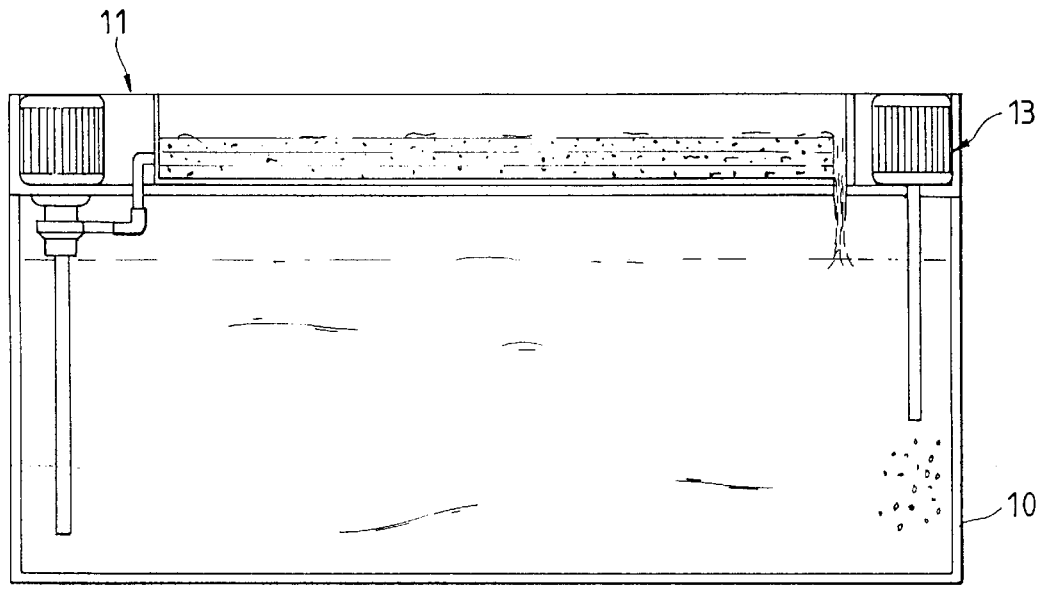
FIG. 1 shows a schematic view of an aquarium of the prior art.
Figure 3:
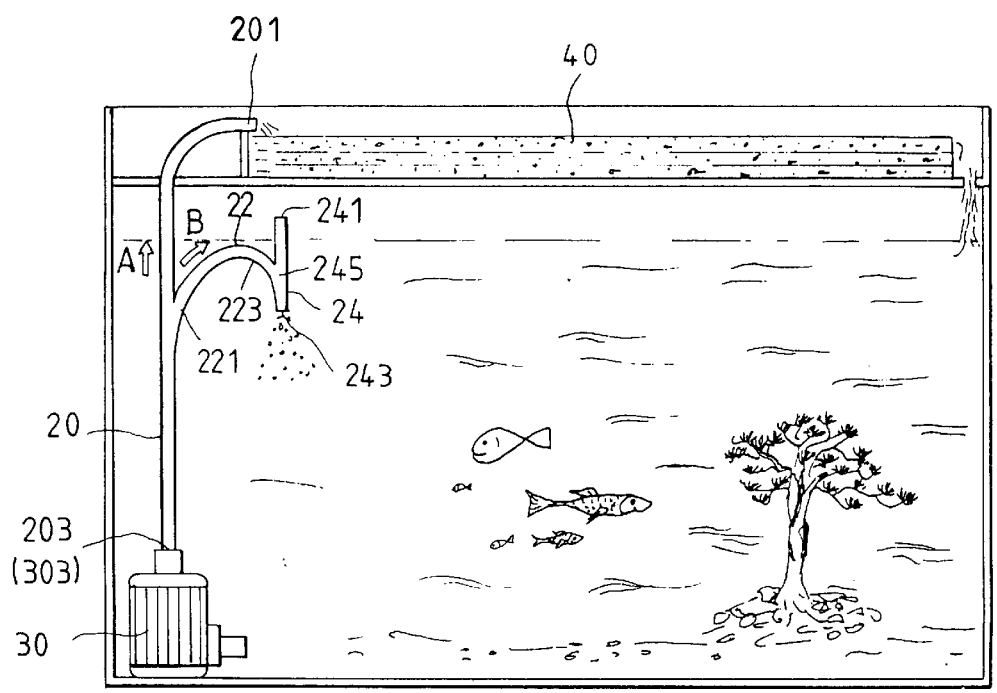
FIG. 3 shows a schematic view of the present invention at work.
Figure 2:
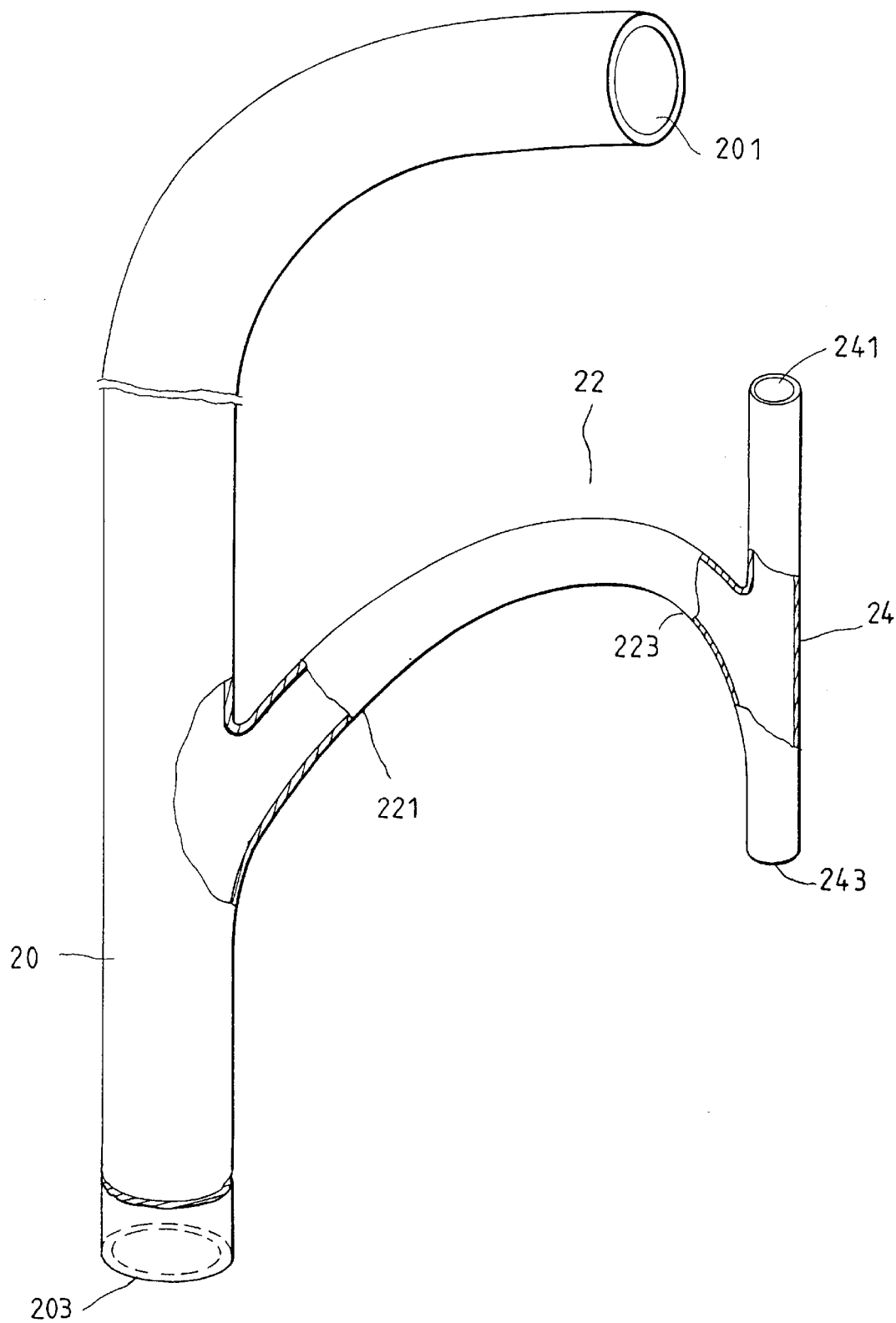
FIG. 2 shows a perspective view of a preferred embodiment of the present invention.
Figure 4:
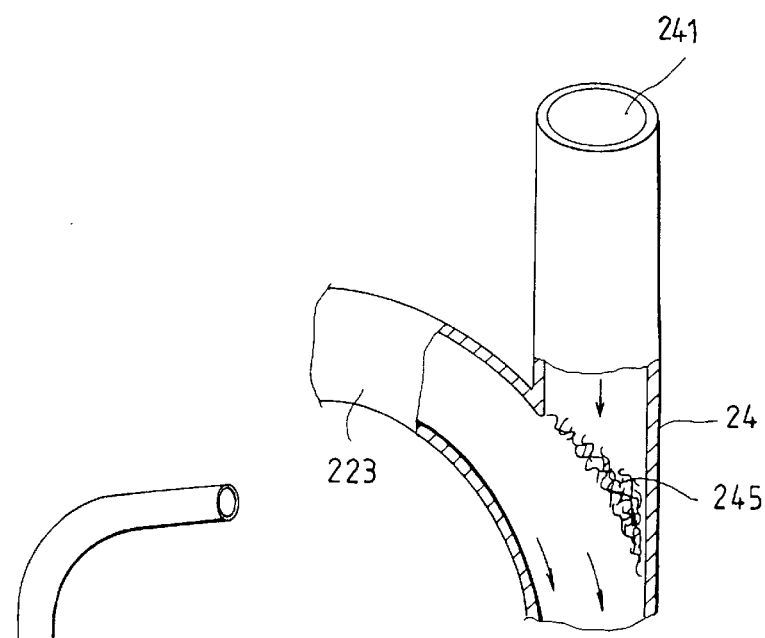
FIG. 4 shows a partial enlarged portion of the preferred embodiment as shown in FIG. 3.

As shown in FIGS. 2–4, an aquarium manifold embodied in the present invention is composed of a water tube 20 of a plastic material, a by-pass tube 22, and an aerating tube 24.

The by-pass tube 22 is branched out of the water tube 20 such that the by-pass tube 22 has an uphill segment 221 and a downhill segment 223. The aerating tube 24 is branched out of the downhill segment 223 of the by-pass tube 22 such that the aerating tube 24 is parallel to the water tube 20.

The water tube 20 is submerged such that the bottom end 203 of the water tube 20 is connected with the outlet 303 of a pump 30, and that the top end 201 of the water tube 20 is in communication with a filtration device 40 of the aquarium and further that the top end 241 of the aerating tube 24 is below the water surface of the aquarium to remain in contact with the atmospheric air.

As the pump 30 is started, the aquarium water is forced to flow through the water tube 20 in the direction indicated by an arrow "A" such that the aquarium water is discharged into the filtration device 40 via the top end 201 of the water tube 20. The filtered water is then allowed to flow back into the aquarium via another end of the filtration device 40, as illustrated in FIG. 3. In the meantime, some of the water in the water tube 20 is forced to flow into the by-pass tube 22, as indicated by an arrow "B" in FIG. 3. The water in the by-pass tube 22 is discharged into the aquarium tank via the bottom end 243 of the aerating tube 24.

As the aquarium water is forced into the by-pass tube 22, the flow rate of the water is reduced as soon as water enters the uphill segment 221 of the by-pass tube 22. However, before the water flows into the aerating tube 24 from the by-pass tube 22, the flow rate of the water is increased as the water flows into the downhill segment 223 of the by-pass tube 22. The acceleration of the water flow in the downhill segment 223 brings about the water turbulence in the aerating tube 24, as illustrated in FIG. 4. As a result, a relatively low pressure area 245 is generated in the area where the by-pass tube 22 and the aerating tube 24 meet. It must be noted here that the low pressure area 245 has a pressure lower than the pressure of the atmospheric air surrounding the top end 241 of the aerating tube 24. As a result, the atmospheric air is drawn into the low pressure area 245 via the top end 241 of the aerating tube 24. The atmospheric air is mixed with the air of the low pressure area 245 before the atmospheric air is forced into the aquarium water via the bottom end 243 of the aerating tube 24.

Figure 5:
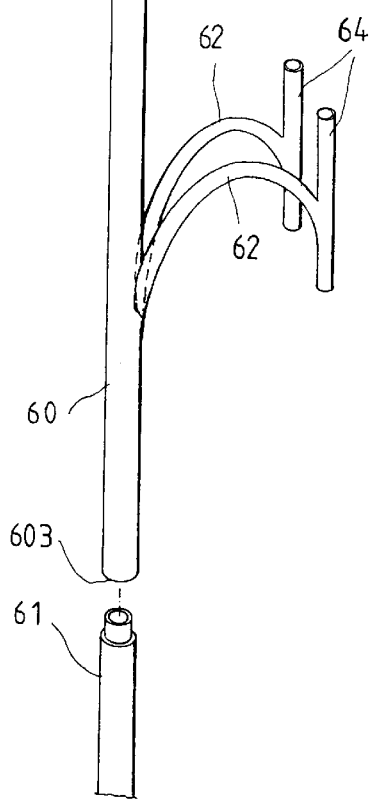
FIG. 5 shows a perspective view of another preferred embodiment of the present invention.

As shown in FIG. 5, the aquarium manifold of the second preferred embodiment of the present invention is composed of a water tube 60, two by-pass tubes 62, and two aerating tubes 64 parallel to the water tube 60. The manifold of the second preferred embodiment of the present invention is used as an example to illustrate the fact that the manifold of the present invention may consist of one or more by-pass tubes and the aerating tubes. In addition, the by-pass tubes 62 have an inner diameter which becomes gradually smaller in the direction towards the aerating tube 64. As a result, the flow rate of the water is increased gradually in the by-pass tubes 62 so as to bring about effectively the water turbulence in the aerating tubes 64. Moreover, the water tube 60 of the second preferred embodiment of the present invention is provided with an extension tube 61 which is fastened with the bottom end 603 of the water tube 60. The extension tube 61 has a predetermined length, which is dependent on the depth of the aquarium tank.

In must be noted here that both water tubes 20 and 60 of the present invention have a top end that is bendable so as to remain in communication with the filtration device of the aquarium.

The embodiments of the present invention described above are to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A manifold for use in aerating and circulating water of an aquarium, said manifold comprising:

a main water tube of a predetermined length and having a bottom end engageable with a pump located at the bottom of the aquarium, said main water tube further having a top end for communicating with a filtration device located at the top portion of the aquarium;

at least one bypass tube of a predetermined length and extending from said main water tube to provide an auxiliary passage for water of the aquarium; and at least one aerating tube extending from a free end of said bypass tube such that said aerating tube is parallel to said main water tube, and that one end of said aerating tube is for contacting atmospheric air, and further that another end of said aerating tube is for submerging in water of the aquarium, wherein said bypass tube forms a predetermined angle with said main water tube such that said bypass tube is provided with an uphill segment contiguous to said main water tube and a downhill segment contiguous to said aerating tube.

2. A The manifold as defined in claim 1, wherein said bypass tube has an inner diameter which becomes progressively smaller from one end contiguous to said main water tube towards another end contiguous to said aerating tube.

3. The manifold as defined in claim 1, wherein said main water tube is provided with an extension tube which is fastened with said bottom end of said main water tube and is engaged with the pump.

4. The manifold as defined in claim 1, wherein said top end of said main water tube is bendable.

\* \* \* \* \*